US008698629B1

(12) United States Patent
Stanford et al.

(10) Patent No.: US 8,698,629 B1
(45) Date of Patent: Apr. 15, 2014

(54) RFID READERS WITH ENCAPSULATING COMMANDS

(75) Inventors: Theron Stanford, Seattle, WA (US); Christopher J. Diorio, Shoreline, WA (US); Harley Heinrich, Snohomish, WA (US)

(73) Assignee: Impinj, Inc., Seattle, WA (US)

( * ) Notice: Subject to any disclaimer, the term of this patent is extended or adjusted under 35 U.S.C. 154(b) by 326 days.

(21) Appl. No.: 13/164,593

(22) Filed: Jun. 20, 2011

Related U.S. Application Data

(63) Continuation-in-part of application No. 12/035,393, filed on Feb. 21, 2008, now Pat. No. 7,999,675.

(60) Provisional application No. 61/357,199, filed on Jun. 22, 2010.

(51) Int. Cl.
*G08B 13/14* (2006.01)
*H04Q 5/22* (2006.01)
*H02J 13/00* (2006.01)

(52) U.S. Cl.
USPC ..... 340/572.1; 340/10.1; 340/10.3; 340/10.5; 340/9.11; 340/568.8

(58) Field of Classification Search
USPC .................................. 340/572.1, 10.1, 10.2
See application file for complete search history.

(56) References Cited

U.S. PATENT DOCUMENTS

| 2008/0290993 | A1* | 11/2008 | Ryoo et al. | 340/10.1 |
| 2010/0017617 | A1* | 1/2010 | Lee et al. | 713/185 |
| 2010/0019883 | A1* | 1/2010 | Eom et al. | 340/10.1 |
| 2010/0225446 | A1* | 9/2010 | Huang | 340/10.1 |

* cited by examiner

*Primary Examiner* — George Bugg
*Assistant Examiner* — Jack K Wang
(74) *Attorney, Agent, or Firm* — Turk IP Law, LLC

(57) ABSTRACT

Radio Frequency Identification (RFID) readers may transmit one or more encapsulated commands within the payload of an encapsulating command. An encapsulated command includes at least a command code and an instruction. A reader may instruct a tag to store the encapsulated command(s) or instruction(s) for later execution. A sequence of encapsulated commands may be contained within one encapsulating command or spread across multiple encapsulating commands. The sequence of encapsulated commands, or the sequence of instructions associated with the encapsulated commands, may form a program. The reader may cause the tag to execute the instructions or program upon receipt, upon a trigger event, serially or in parallel, and/or may cause the tag to modify the instructions or program by adjusting parameters. The reader may later instruct a tag to execute the instructions or program via another command which, in some cases, may be sent prior to tag singulation.

23 Claims, 18 Drawing Sheets

RFID READER SYSTEM CONFIGURATION WITH OPTIONAL LOCAL AND REMOTE COMPONENTS

ARCHITECTURE OF INTERFACE CONVERTER WITH AGENT AND UTILITY

SAMPLE SCREENSHOT OF INTERFACE CONVERTER EXPOSING TO AGENT OPTIONS TO CONTROL FUNCTIONALITY OF MULTIPLE INSTRUCTION STORAGE UTILITY

900

950

| ITEM | COMMAND | MEMBANK | POINTER | DATA | RN | CRC-16 |
|---|---|---|---|---|---|---|
| # OF BITS | 8 | 2 | EBV | 16 | 16 | 16 |
| DESCR. | 11000011 | 00: Reserved<br>01: EPC<br>10: TID<br>11: User | Address pointer | RN16 XOR word to be written | handle | |

*TABLE 6.35 - WRITE COMMAND OF THE GEN2 SPECIFICATION*

FIG. 10A

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.19 - SELECT COMMAND OF THE GEN2 SPECIFICATION*

FIG. 10B

|  | Mask | | | | |
|---|---|---|---|---|---|
|  | FEF | | | FCF | |
|  | Subfield_1 | ... | Subfield_N | Command code | Instruction |
| # of bits | Variable | Variable | Variable | 5 | Variable |
| description | – | – | – | – | – |

*MASK FIELD OF A SELECT COMMAND
REPURPOSED TO ENCAPSULATE A COMMAND*

FIG. 10C

RFID READERS WITH ENCAPSULATING COMMANDS

CROSS REFERENCE TO RELATED APPLICATIONS

This application claims the benefit of U.S. Provisional Patent Application Ser. No. 61/357,199 filed on Jun. 22, 2010, and is a continuation-in-part (CIP) of co-pending U.S. patent application Ser. No. 12/035,393, filed Feb. 21, 2008, commonly assigned herewith. The disclosures of these patent applications are hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna and an RFID integrated circuit (IC) including a radio section, a power management section, and frequently a logical section, a memory, or both. In some RFID tags the power management section employs an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling an RFID reader to transmit one or more commands encapsulated within the payload of an encapsulating command for tag storage and/or execution, where both the encapsulated command(s) and the encapsulating command include at least a command-code portion and an instruction or payload portion. In some embodiments the encapsulating command can be a Select command of the Gen2 Specification (Class-1 Generation-2 UHF RFID Protocol for Communications at 860 MHz-960 MHz by EPCglobal, Inc., version 1.2.0, which is hereby incorporated in its entirety by reference). In other embodiments the encapsulating command can be another command of the Gen2 Specification, or an entirely new command, or a command associated with another standardized or custom communication protocol. Likewise, in some embodiments the encapsulated command(s) can be commands of the Gen2 Specification, or portions of command(s) of the Gen2 Specification, or new commands, or perhaps commands associated with another protocol entirely.

In some embodiments the payload of the encapsulating command contains one or more encapsulated command(s) that the tag stores in memory for later execution. In some embodiments the tag stores only the instruction portion of the encapsulated command(s). The tag may combine the encapsulated command(s), or the instruction portion of the encapsulated command(s), with other commands or instructions already known to or stored in the tag. The encapsulated commands may be contained in a single encapsulating command or spread across multiple encapsulating commands, and the instruction sequence may perform a single operation or multiple operations.

In some embodiments, a reader causes a tag to execute the instruction portion of a command encapsulated in the payload of the encapsulating command upon receipt. If there are multiple encapsulated commands then the tag may execute their instructions serially or in parallel, and may modify the instruction execution based on received and/or stored parameters. In some embodiments, the reader causes the tag to store the encapsulated commands or the instruction portion of the encapsulated commands for later execution, for example upon receiving a further command or when triggered by a triggering event (such as a button push, a temperature change, a humidity change, a motion, an acceleration, or a myriad of other possible sensor inputs or triggers).

In some embodiments an instruction may implement a functionality of an existing command, such as the write functionality of a Gen2 Specification Write command or the lock functionality of a Gen2 Specification Lock command.

In some embodiments a reader may transmit a command known as a run command to a tag that instructs a tag to execute one or more programs. The tag may receive the run command prior to being singulated. The run command may include the one or more programs, or may specify one or more programs stored in tag memory, or a mix of both. The tag may have stored a program as a sequence of instructions received in response to a prior encapsulating command, or in response to another command, or may have had the instructions preprogrammed. In some embodiments the instructions of a stored program may include command codes, such as the write-command-code for a Write command, so the tag can easily determine the stored instruction is a write instruction.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIGS. 10A-B are tables illustrating fields of the Write and Select commands of the Gen2 Specification according to embodiments;

FIG. 10C illustrates repurposing the Mask field of the Select command of FIG. 10B for encapsulating another command.

DETAILED DESCRIPTION

Figure 1:
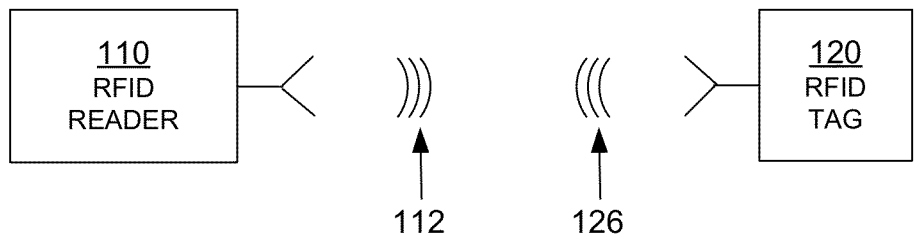
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, an "instruction" refers to a request to a tag to perform a single explicit action (e.g., write data into memory). A "program" refers to a request to a tag to perform a set or sequence of instructions (e.g., read a value from memory and, if the read value is less than a threshold then lock a memory word). "Programmable" refers to instructions or programs that are changeable or replaceable. A "memory" can be ROM, RAM, SRAM, DRAM, NVM, EEPROM, FLASH, Fuses, FRAM, or other data-storage devices known to those skilled in the art. Some memories, memory types, and memory portions may be writeable and some not. "Singulation" refers to choosing or isolating a single tag from a population of tags through one or more commands transmitted by a reader.

A "command" as used herein refers to a request to a tag to perform one or more actions, and includes one or more instructions preceded by a command code. As one example, "Select" is a command of the Gen2 Specification whose command code is the bit string 1010. A Select command selects a particular tag population based on user-defined criteria, enabling union (U), intersection (∩), and negation (~) based tag partitioning. An encapsulating command is a command that contains or encapsulates one or more other commands in its payload. An encapsulating command may further instruct a tag to execute instructions in tag memory, convey a parameter to a tag, specify an execution order for instructions, tell the tag to store one or more commands or instructions, trigger the execution of one or more instructions, or perform some other custom function. For example, a Custom Select Command is an example of an encapsulating command that is formed by encapsulating one or more other commands within the payload of a Select command of the Gen2 Specification. A run command is a command that indicates one or more programs for a tag to execute, either immediately or upon some trigger event. An encapsulating command may also be a run command, and vice-versa. Further, a run command may also be a Custom Select Command based on the Select command of the Gen2 Specification.

Finally, a "Query" is a command of the Gen2 Specification that initiates an inventory round in which a reader singulates tags and one-at-a-time receives their EPCs. A reader terminates the inventory round by either sending a subsequent Query command (which also starts a new inventory round) or a Select command. After starting an inventory round, a reader may alternatively send QueryAdjust and QueryRep commands, which are variants of the Query command, to continue singulating tags. While the Query/QueryAdj/QueryRep commands are specific to the Gen2 Specification, other "Query-like" commands for tag singulation (e.g., as may be introduced by the EPCglobal or other standards bodies or even proprietary protocols) may perform the same or analogous functions.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
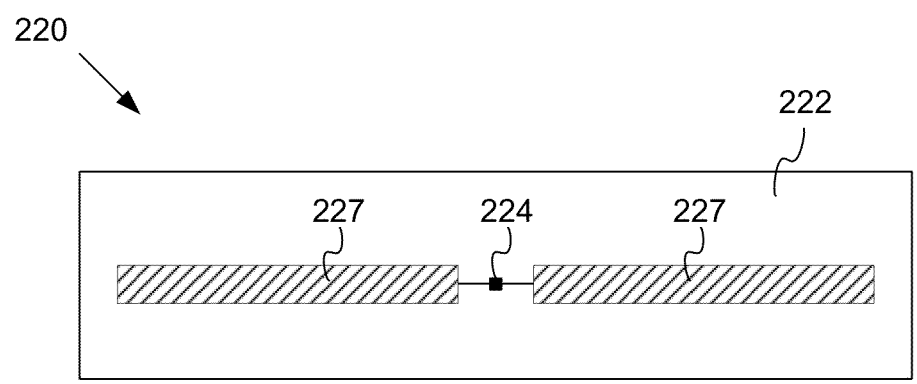
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224 (also referred to as chip). IC 224 is arranged on inlay 222.

Tag 220 also includes an antenna for exchanging wireless signals with its environment. The antenna is usually flat and formed on inlay 222. IC 224 is electrically coupled to the antenna via suitable antenna connections (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments, an antenna can be made with even a single segment. Different points of the segment can be coupled to one or more of the antenna connections of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna connections of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
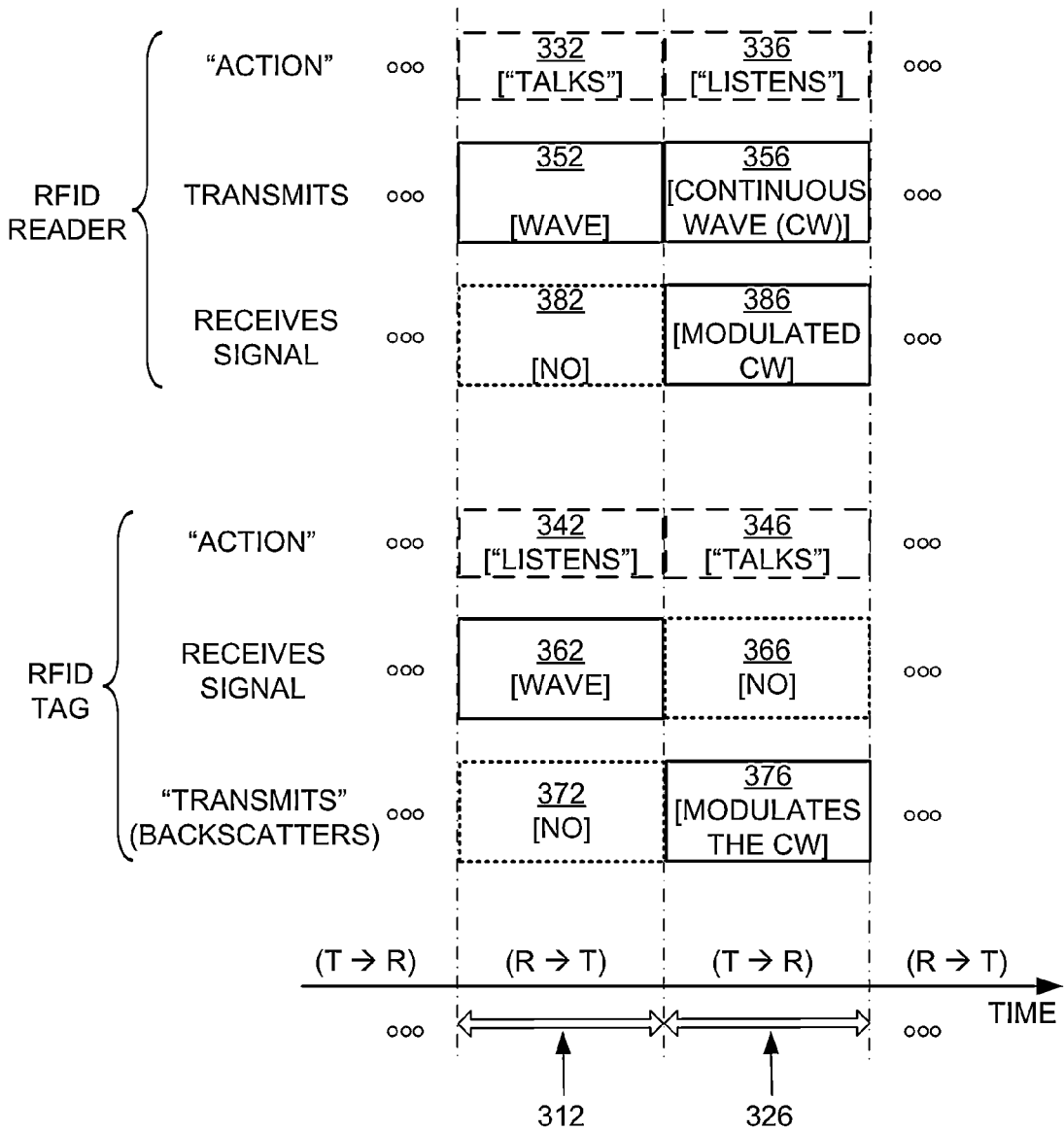
FIG. 3 is a conceptual diagram of communication in an RFID system for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
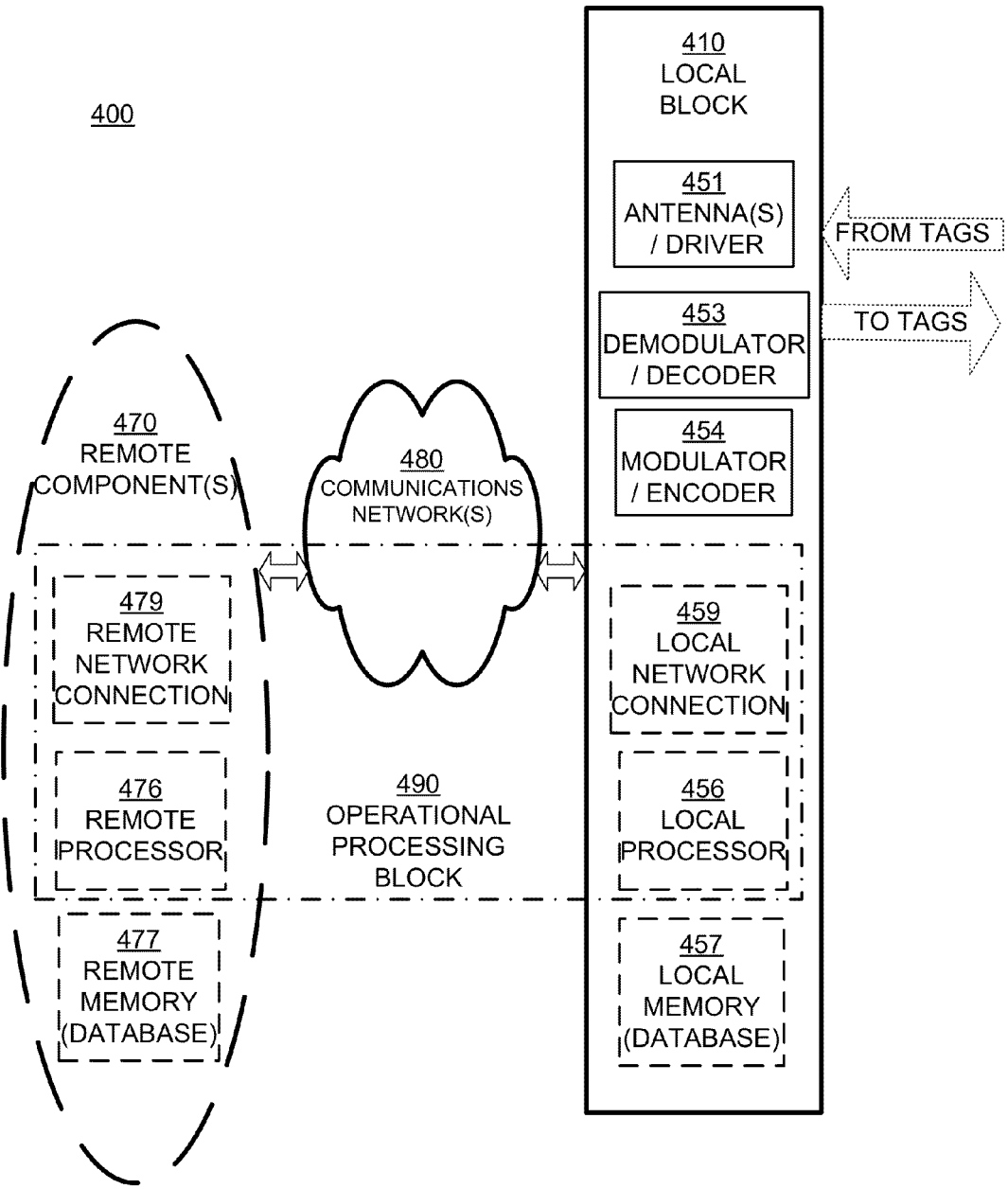
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement commands that include one or more instructions to be stored in tag memories; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in a single chip with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC codes, instructions and/or rules for how to encode commands for the tags, modes for controlling antenna 451, instructions and order of instructions to be sent to the tags, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 479 for communicating with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement commands with one or more instructions to be stored and subsequently executed in tags, similar to local processor 456.

Remote component(s) 470 can also include a remote memory 477. Remote memory 477 can be made in any way known in the art, such as was described with reference to local memory 457. Remote memory 477 may include a local database, and a remote database of a Standards Organization, such as one that can reference EPCs. Remote memory 477 may also contain information associated with command, tag profiles, instructions, instruction parameters, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
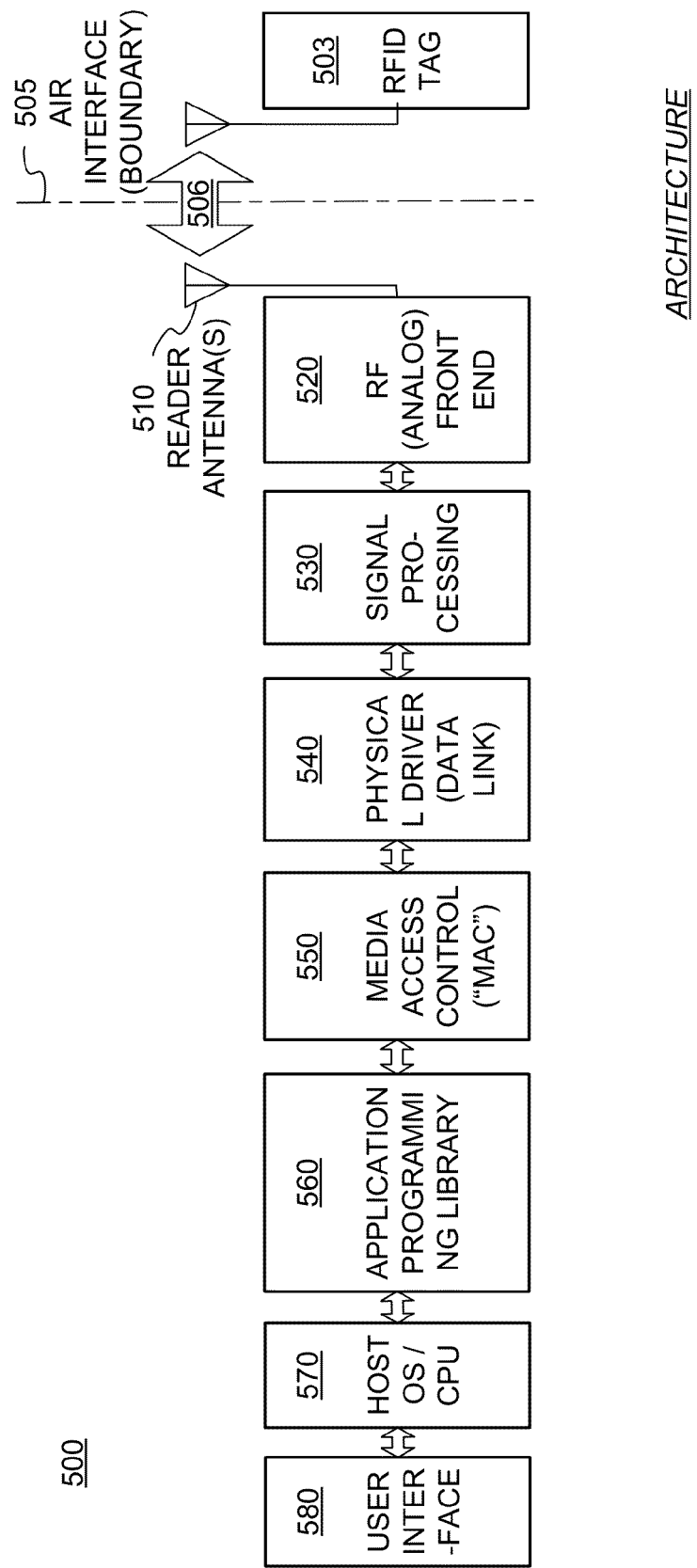
FIG. 5 is a block diagram illustrating an overall architecture of an RFID system according to embodiments.

FIG. 5 is a block diagram illustrating an overall architecture of an RFID reader 500 according to embodiments. It will be appreciated that RFID reader 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. RFID tag 503 conducts a wireless communication 506 with the remainder, via the air interface 505. It is noteworthy that air interface 505 is really only a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550, which is also known as MAC layer module. In one embodiment, MAC layer module 550 exchanges packets of bits with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with implementing commands carrying one or more instructions to be stored and subsequently executed by tags prior to a tag being singulated.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID waveforms and in the other direction for receiving RFID waveforms. In transmitting mode, waveform initiation can be in any one of the modules. Ultimately, signals are routed to reader antenna(s) 510 to be transmitted as wireless waves. In receiving mode, reader antenna(s) 510 receives wireless waves, which are in turn processed successively by the various modules in the chain. Processing can terminate in any one of the modules.

The architecture of RFID system 500 is presented for purposes of explanation, and not of limitation. Its particular subdivision into modules need not be followed for creating embodiments. Furthermore, the features of the present disclosure can be performed either within a single one of the modules, or by a combination of them.

Often, for the sake of convenience only, it is desirable to implement and describe a program as software. The software can be unitary, or thought in terms of various interconnected distinct software modules.

Figure 6:
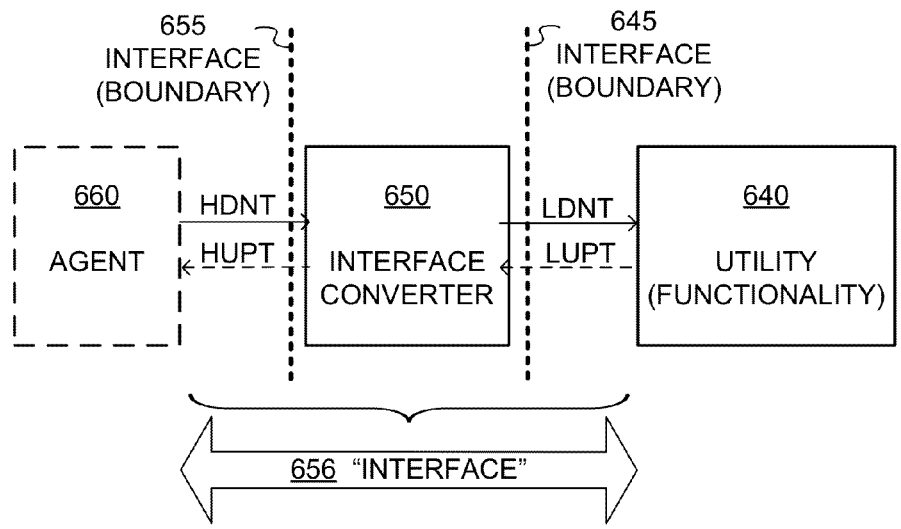
FIG. 6 is a block diagram illustrating architecture for an interface converter according to embodiments.

FIG. 6 is a block diagram illustrating an architecture 600 for an interface converter according to embodiments. Architecture 600 includes a utility 640, which is a mechanism for performing some or all of the reader features described above.

More particularly, utility 640 may cause a tag to store one or more received instructions in its memory, execute the instructions in response to a subsequent command or trigger event, and respond differently to a reader command based on results generated by executing the instructions.

Architecture 600 additionally includes an interface converter 650 and an agent 660. Embodiments also include methods of operation of interface converter 650. Interface converter 650 enables agent 660 to control utility 640. Interface converter 650 is so named because it performs a conversion, a change, as will be described in more detail below. Agent 660, interface converter 650, and utility 640 can be implemented in any way known in the art. For example, each can be implemented in hardware, middleware, firmware, software, or any combination thereof. In some embodiments, agent 660 is a human.

Between interface converter 650, agent 660 and utility 640 there are respective boundaries 655, 645. Boundaries 655, 645 are properly called interfaces, in that they are pure boundaries, as is the above described air interface.

In addition, it is a sometimes informal usage to call the space between boundaries 655 and 645, which includes interface converter 650, an "interface" 656. Further, it is common to designate this space with a double arrow as shown, with an understanding that operations take place within the arrow. So, although "interface" 656 is located at a boundary between agent 660 and utility 640, it is not itself a pure boundary. Regardless, the usage of "interface" 656 is so common for interface converter 650 that this document sometimes also refers to it as an interface. It is clear that embodiments of such an "interface" 656 can be included in this invention, if they include an interface converter that converts or alters one type of transmission or data to another, as will be seen below.

Agent 660 can be one or more layers in an architecture. For example, agent 660 can be something that a programmer programs to. In alternative embodiments, where agent 660 is a human, interface converter 650 can include a screen, a keyboard, etc. An example is now described.

Figure 7:
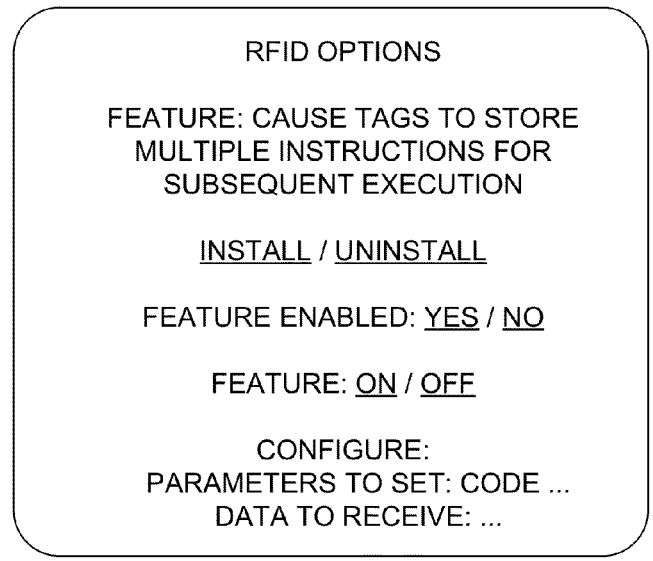
FIG. 7 is a sample screenshot of an interface converter such as the interface converter of FIG. 6, according to an embodiment.

FIG. 7 is a sample screenshot 750 of an interface converter, such as the interface converter of FIG. 6. Screenshot 750 can be that of a computer screen for a human agent, according to an embodiment. What is displayed in screenshot 750 exposes the functionality of a utility, such as utility 640. Inputs by the user via a keyboard, a mouse, etc., can ultimately control utility 640. Accordingly, such inputs are received in the context of screenshot 750. These inputs are determined from what is needed for controlling and operating utility 640. An advantage with such interfacing is that agent 660 can prepare RFID applications at a higher level, without needing to know how to control lower level RFID operations. Such lower level RFID operations can be as described in the Gen 2 Spec, in other lower level protocols, etc. Utility 640 can be controlled in any number of ways. Some such ways are now described.

Returning to FIG. 6, one way interface converter 650 can be implemented is as a software Application Programming Interface (API). This API can control or provide inputs to an underlying software library, and so on.

Communications can be made between agent 660, interface converter 650, and utility 640. Such communications can be a s input or can be converted, using appropriate protocols, etc. What is communicated can encode commands, data, etc. Such communications can include any one or a combination of the following: a high-down communication HDNT from agent 660 to interface converter 650; a low-down communication LDNT from interface converter 650 to utility 640; a low-up communication LUPT from utility 640 to interface converter 650; and a high-up communication HUPT from interface converter 650 to agent 660. These communications can be spontaneous, or in response to another communication, or in response to an input or an interrupt, etc.

Commands are more usually included in communications HDNT and LDNT, for ultimately controlling utility 640. Controlling can be in a number of manners. One such manner can be to install utility 640, or just a feature of it. Such installing can be by spawning, downloading, etc. Other such manners can be to configure, enable, disable, or operate utility 640, or just a feature of it. These commands can be standalone, or can carry parameters, such as data, instructions to be stored by tags, etc. In some embodiments interface converter 650 can convert these commands to a format suitable for utility 640.

Data is more usually included in communications HUPT and LUPT. The data can inform as to success or failure of executing an operation. The data can also include tag data, which can be both codes read from tags and data about reading tags (such as time stamps, date stamps, etc.). In some embodiments interface converter 750 can convert the data to a format suitable for agent 660, including in some cases aggregating, filtering, merging, or otherwise altering the format or utility of the data.

It should be noted that what passes across a single pure boundary is unchanged (by the mere definition of what is a pure boundary). But what passes through interface converter 650 can be changed or not. More particularly, high-down communication HDNT can be being encoded similarly to, or differently from, low-down communication LDNT. In addition, low-up communication LUPT can be encoded similarly to, or differently from, high-up communication HUPT. When different, the difference can be attributed to interface converter 650, which performs a suitable change, or conversion, of one communication to another. The change, or conversion, performed by interface converter 650 is for exposing the functionality of utility 640 to agent 660, and vice versa. In some embodiments, a command is converted, but a parameter is passed along without being converted. Plus, what is not converted at one module may be converted at another. Such modules taken together can also form an interface converter according to embodiments.

Figure 8:
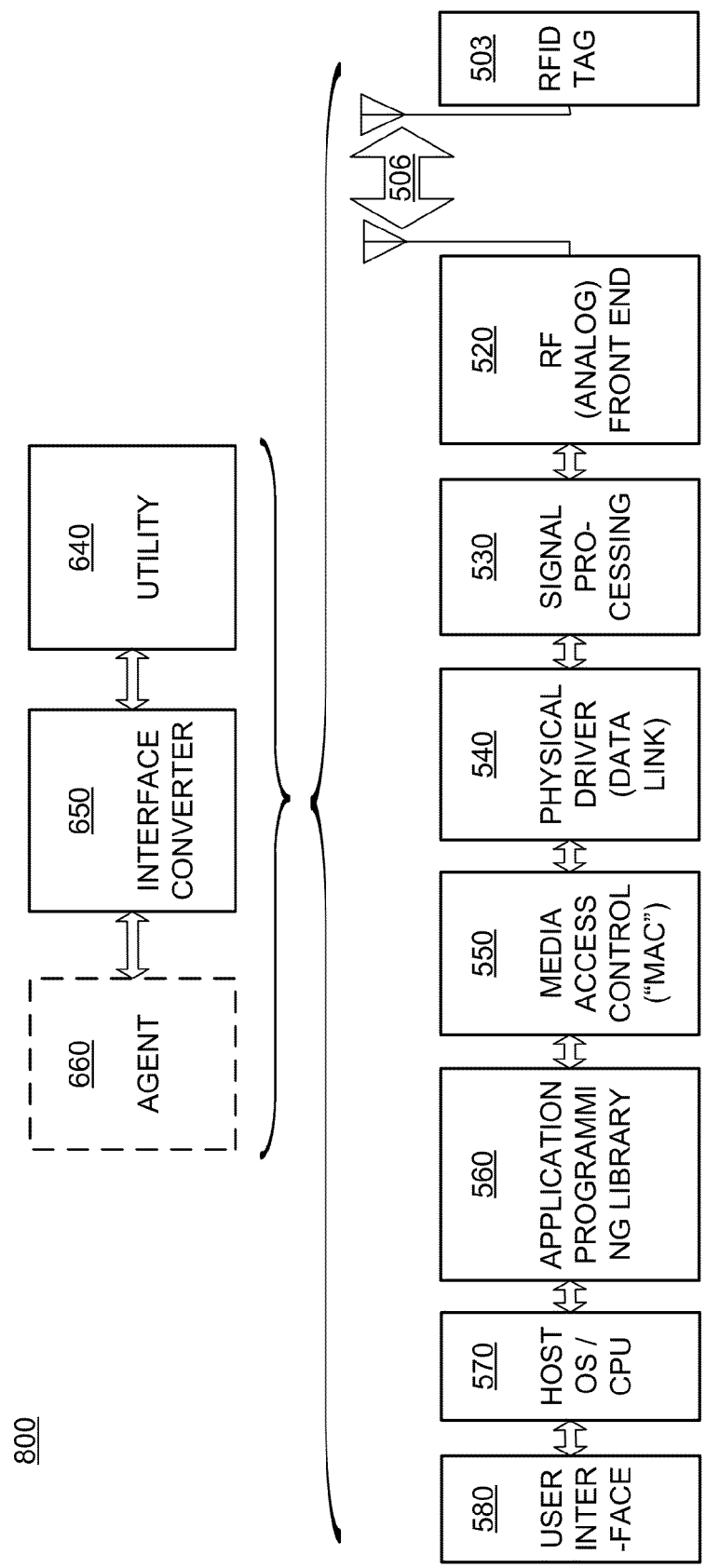
FIG. 8 is a diagram for showing a correspondence for how components of FIG. 6 can be implemented by those of FIG. 5, in embodiments where the interface converter is implemented by a reader.

Agent 660, interface converter 650, and utility 640 can be implemented as part of a reader, or as a different device. For being implemented as part of a reader, FIG. 8 suggests a scheme 800 where agent 660, interface converter 650, and utility 640 can be implemented in connection with respective reader modules that are suitable, depending on the requirements.

As mentioned previously, embodiments are directed to RFID readers transmitting encapsulating or run commands to RFID tags. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

The same advances in semiconductor technology that have enabled a tag to be powered by an incoming RF signal also enable a tag to perform complex operations, such as determining whether the temperature or acceleration the tag is experiencing can damage the object to which the tag is attached. The tag typically performs such a complex operation by executing a sequence of instructions. It would be advantageous for a reader to be able to tell a population of tags to perform a sequence of instructions and then respond, or not respond, or perform some operation, based on the result.

However, in today's tags that conform to the Gen2 Specification, a reader cannot cause tags in a population to simultaneously execute an instruction sequence. Instead, the reader must first singulate (choose or isolate) a tag, and then send successive commands to the singulated tag to execute the instruction sequence, one command (i.e. one instruction) at a time. The reader then singulates another tag and sends the same successive commands.

For m tags and n operations, the above process requires the reader to perform m singulations and send m×n commands. The process can be slow and time consuming, because the reader must interact with each tag serially and must send each instruction to a tag one command at a time, and does not allow a reader to tell a population of tags to collectively execute a sequence of instructions in parallel. For readers with limited power sources or situations where time is limited (e.g., tags moving past the reader), this repetitive process may not even be practical. Furthermore, the process does not allow a reader to first tell the tags to perform a sequence of instructions and then decide whether to participate in subsequent communications with the reader based on a result of the instructions.

In embodiments described herein, a reader may address these issues by encapsulating one or more instructions in the payload of an encapsulating command. A tag, upon receiving an encapsulating command, may execute the encapsulated instructions, store the encapsulated instructions for later execution, or both. In some instances the encapsulating command may instruct a receiving tag to execute one or more instructions that are stored in tag memory, or to execute a combination of sent and stored instructions. In the case of multiple instructions, the encapsulating command may also be known as a run command and the multiple instructions as a program. Each encapsulated instruction may itself be a command, such as a write command that instructs a tag to write data to memory that a reader is able to send to a singulated tag but instead chooses to encapsulate within an encapsulating command. A reader may broadcast the encapsulating command to multiple tags simultaneously before beginning an inventory round. Thus, multiple tags can execute instruction sequences in parallel, which is faster than serially singulating and then serially instructing tags. The tag may, based on a result of the executed instruction(s) or program(s), determine whether to participate in a subsequent inventory round, modify a behavior during a subsequent inventory round, or store a result in a tag memory.

An encapsulating command according to some embodiments may contain parameters that specify how a tag should execute encapsulated and/or stored instructions. For example, an encapsulating command may modify the execution order of stored instructions. When a tag receives the encapsulating command it executes the stored instructions in the modified order. In some embodiments, the tag may store the parameters. The encapsulating command may include indicators to those stored parameter(s), or the tag may itself determine when to apply the stored parameters.

Figure 9:
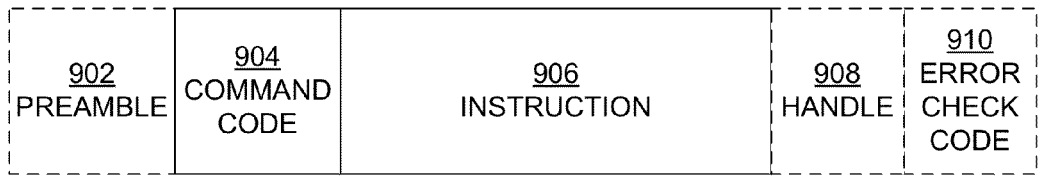
FIG. 9 depicts the structure of a regular command, an encapsulating command, and an encapsulated command according to embodiments.
Figure 9:
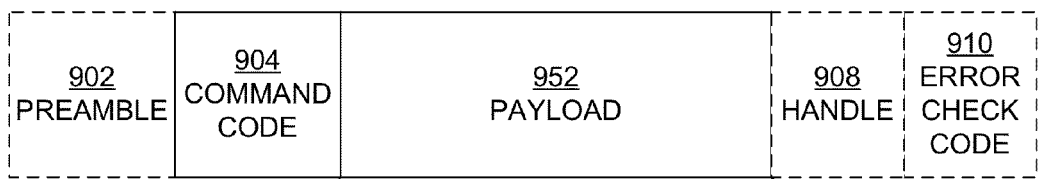
Figure 9:
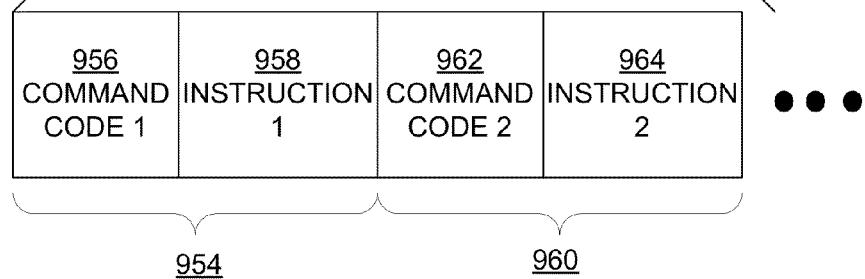

FIG. 9 depicts a typical structure for a regular command 900 and an encapsulating command 950 according to embodiments.

Regular command 900 includes an optional preamble 902, a command code 904, an instruction 906, an optional handle 908, and an optional error-check code 910. Preamble 902 typically provides, among other things, an easily detected shape that facilitates reader-to-tag communications. Command code 904 denotes the command type, and instruction 906 contains the information necessary to execute the command. Handle 908 is a numerical handle that allows the reader to specify the particular tag, and error-check code 910 allows the tag to check the command for errors. Each of these fields is described in more detail in the Gen2 Specification. Examples of Gen2 Specification Write and Select commands and their fields are shown in FIGS. 7A-B.

The encapsulating command 950 also has an optional preamble 902, a command code 904, an optional handle 908, and an optional error-check code 910, each of which are similar to the corresponding fields of the regular command 900. However, in place of the instruction 906 the encapsulating command 950 has a payload 952, which encapsulates one or more other commands. For example, in FIG. 9, the payload 952 includes a first command 954 and a second command 960. The first command 954 includes command code 1 (956) and instruction 1 (958), while the second command 960 includes command code 2 (962) and instruction 2 (964). In some embodiments, payload 952 may indicate one or more instructions or programs stored in tag memory, for example by means of memory pointers to those instructions or programs. Commands in the payload 952 may specify or constitute one or more programs. Optionally, the payload 952 may also include one or more parameters associated with the execution of the encapsulating command 950 itself or of one or more of the commands in or indicated by the payload.

In some embodiments, at least part of the payload or the encapsulating command itself may be encrypted, electronically signed, combined with a message authentication code which authenticates the part of the payload or command that is encrypted, or otherwise secured, via a symmetric or asymmetric cryptographic algorithm or any other cryptographic scheme. In some embodiments an encapsulating command or an encapsulated instruction may include a message count parameter. In these embodiments, each message between a tag and a reader has an associated message count. As messages are passed, the message count included with each message increments sequentially (or in some other manner known to the reader and tag). An unexpected message count (e.g., a tag expects a message count of 4 but sees a message count of 5, or receives two messages, each with a message count of 4) may indicate that a rogue reader is attempting to insert itself into the communications.

As mentioned above, the normal Select command and the Write command of the Gen2 Specification provides examples of how a command carries an instruction. FIG. 10A shows a Write command whose command code is 11000011. The Membank, Pointer, and Data fields comprise the instruction, and instruct a tag to write Data at the address specified by Pointer in the memory bank specified by Membank. The command also contains a 16-bit handle and a 16-bit CRC for error checking. FIG. 10B shows a Select command of the Gen2 Specification that selects a subpopulation of tags for subsequent inventory, as described above.

FIG. 10C shows how the Mask field of the Select command of the Gen2 Specification may be repurposed to encapsulate another command In the depicted embodiment, the Mask field may be subdivided into two primary subfields: a Feature Enabling Field (FEF) and a Feature Command Field (FCF). Upon receiving a Select command, a tag evaluates the FEF fields to determine whether the Select command is a normal Select command or is an encapsulating Select command. If the Select command is an encapsulating Select command then the tag interprets the FCF according to FIG. 10C in which the leading 5 bits specify a command code and the trailing bits may contain instructions, parameters for instructions, memory pointers to instructions, fields indicating programs, memory pointers to programs, or any combination of these items. In general, an encapsulating Select may include a command, activate instructions on the tag, pass a parameter for one or more instructions, and/or pass an address pointer to the location of instructions. Embodiments are not limited to using an FEF and a FCF, but may include fewer or more fields, or alternative field arrangements, that allow encapsulating one or more commands inside another.

Figure 11:
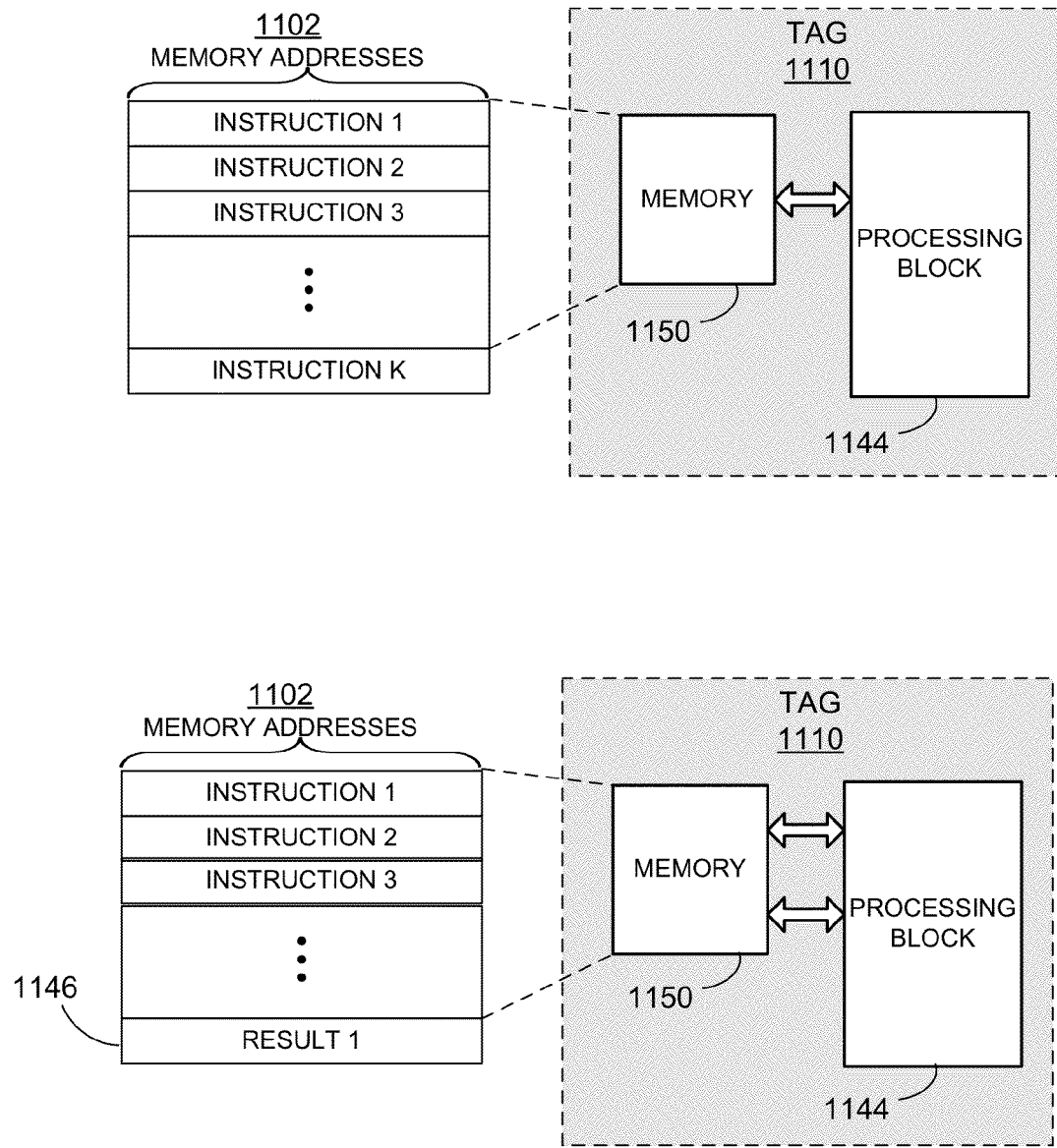
FIG. 11 illustrates how a tag may store received instructions and/or results of executed instructions in memory

FIG. 11 illustrates how an example tag may store received instructions, sequences of instructions (programs), and/or results of performed instructions or programs in its memory. According to some embodiments, instructions 1 through k received in an encapsulating or run command may be stored in memory addresses 1102 of tag memory 1150. Processing block 1144 of tag 1110 may store and/or execute those instructions upon reception. According to other embodiments, the command may include indicators of memory addresses/locations in tag memory 1150 where instructions are already stored. In these cases, processing block 1144 may retrieve and execute the stored instructions based on the indicators in the received command.

In some embodiments, the tag may modify the instruction order based on parameters included in the encapsulating or run command, based on pre-programmed instructions in tag memory 1150, and/or based on one or more results of executing at least a portion of the instructions. Processing block 1144 may store these results (e.g., 1146) in tag memory 1150.

Figure 12:
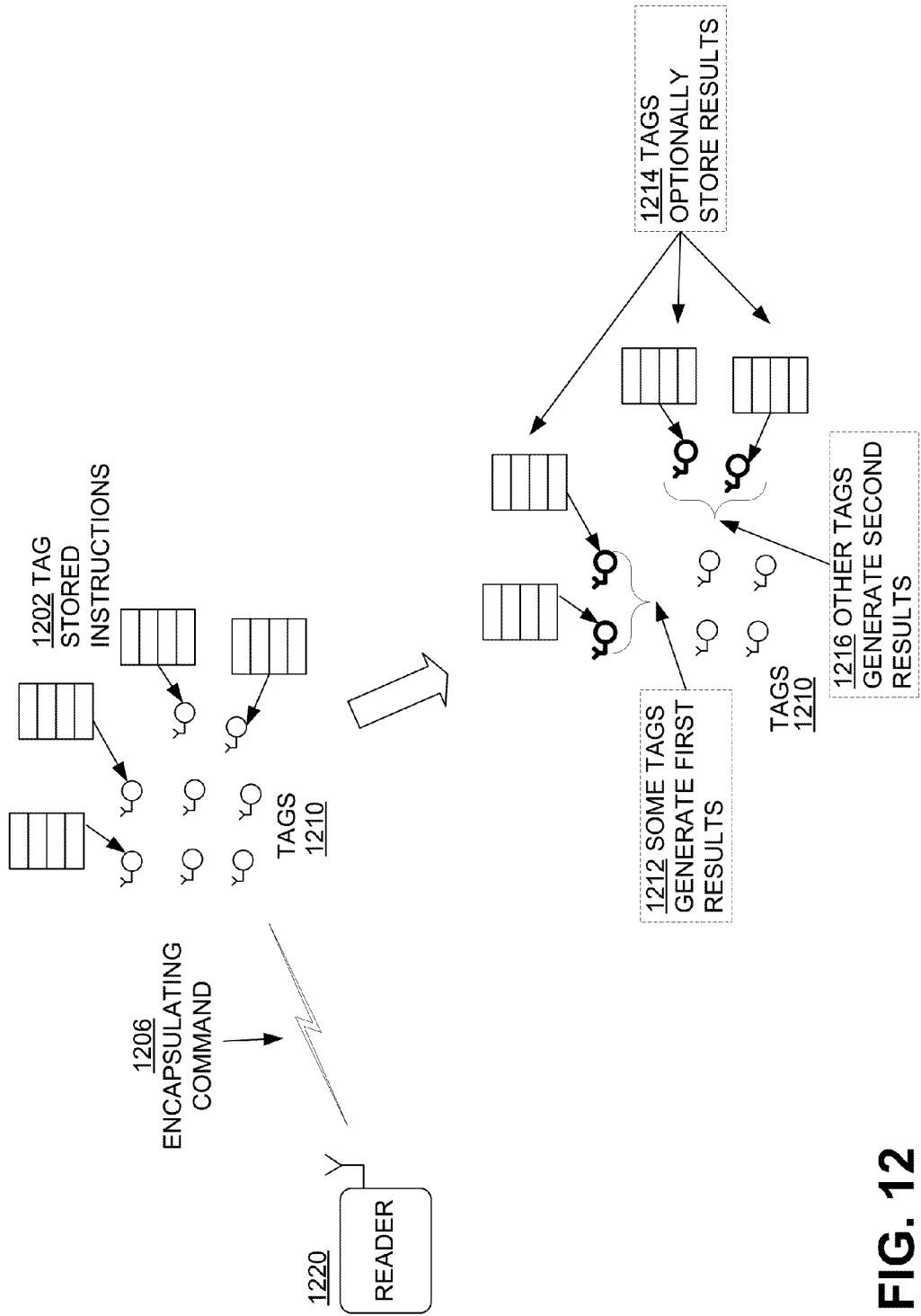
FIG. 12 is a conceptual diagram illustrating tags generating results in response to a reader sending an encapsulating command or a run command according to further embodiments.

FIG. 12 depicts an example scenario illustrating tags generating results in response to an encapsulating or run command according to embodiments. In this example, reader 1220 may send an encapsulating or run command 1206 to tags 1210 and cause the tags to store instruction(s) 1202 in their memories. In response to a subsequent command or a trigger event, as discussed below, the tags 1210 may perform operations based on the stored instructions and generate results.

In some embodiments, a tag may execute the instructions serially or sequentially. In other embodiments a tag may execute the instructions in parallel. The instructions may also be modified by one or more parameters. Thus, some tags may generate first results 1212 in response to the command/trigger event, while other tags in the same group generate second, different results 1216 in response to the same command/trigger event. Some or all of the tags may optionally store the generated results in their memory (1214). The difference in results may arise due to differences in the tags or in their stored memory values or external (such as sensor) data, in different modification of parameters associated with the stored instructions, or differences in instruction execution order. For example, some tags may be programmed at manufacture to use default values for certain parameters (or to execute instructions according to a default order). These tags may perform the same operations as other tags but perform the actual instructions in the operations using different parameter values and/or in different orders/sequences, thus generating different results. Because a tag's behavior (e.g., whether it responds to a reader command, whether it participates in an inventory round, how it operates during an inventory round, whether it stores a particular result) is affected by the results of its executed instructions/programs, differing tag parameters in a population of otherwise similar tags can lead to divergent tag behavior.

In some embodiments, a tag may execute the instructions serially or sequentially. In other embodiments a tag may execute the instructions in parallel. The instructions may also be modified by one or more parameters. Thus, some tags may generate first results 1212 in response to the command/trigger event, while other tags in the same group generate second, different results 1216 in response to the same command/trigger event. Some or all of the tags may optionally store the generated results in their memory (1214). The difference in results may arise due to differences in the tags or in their stored memory values or external (such as sensor) data, in different modification of parameters associated with the stored instructions, or differences in instruction execution order. For example, some tags may be programmed at manufacture to use default values for certain parameters (or to execute instructions according to a default order). These tags may perform the same operations as other tags but perform the actual instructions in the operations using different parameter values and/or in different orders/sequences, thus generating different results. Because a tag's behavior (e.g., whether it responds to a reader command, whether it participates in an inventory round, how it operates during an inventory round, whether it stores a particular result, etc.) is affected by the results of its executed instructions/programs, differing tag parameters in a population of otherwise similar tags can lead to divergent tag behavior.

Figure 13:
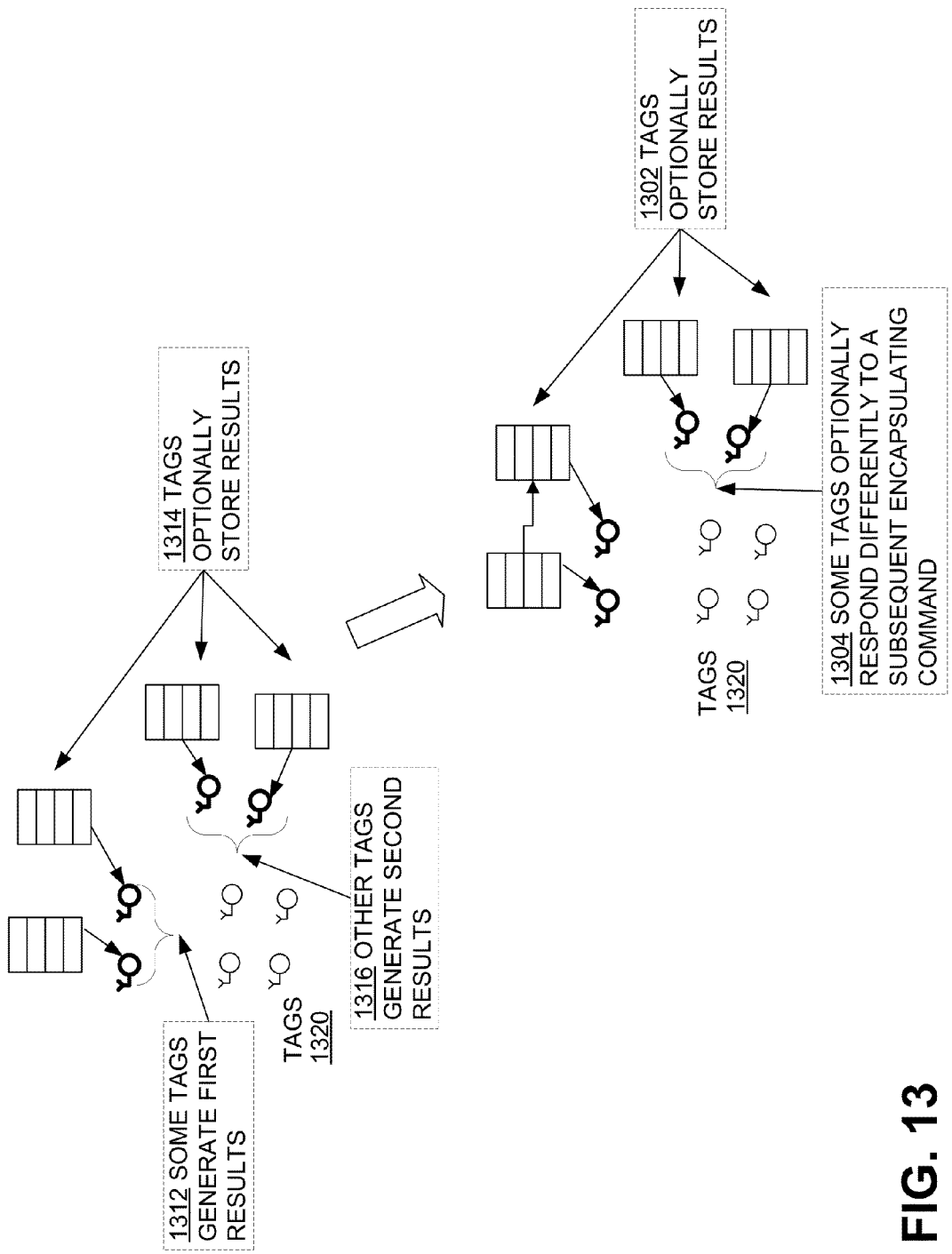
FIG. 13 is a conceptual diagram illustrating tags generating different results in response to a reader sending an encapsulating or run command and optionally responding differently to a subsequent reader command based on the generated results according to some embodiments.

FIG. 13 is a conceptual diagram illustrating tags generating different results in response to a reader command and optionally behaving differently to a subsequent reader command based on the generated results, according to some embodiments.

As described in connection with FIG. 12, although a group of tags may receive the same instructions from a reader, some tags in the group may generate first results 1312, while other tags in the same group may generate second, different results 1316, with the tags optionally storing the generated results (1314). Subsequently, the group of tags may receive an encapsulating, run, or other command from the reader, or a Query or Query-like command that may cause the tags to respond to the reader. In some embodiments, some tags in the group may respond to the reader with different behavior (1304) than other tags in the group. For example, tags may receive a selection command from a reader selecting tags for an inventory round, and may determine whether they participate in that inventory round by comparing stored results 1312, 1314, and/or 1316 with one or more fields in the selection command.

As an example scenario, consider a situation in which a reader is located in a temperature-controlled storage facility and monitoring the temperature of stored items. The reader is tasked with detecting items whose temperatures are outside a prescribed range. Each item is affixed with a tag with a temperature transducer. The reader issues an encapsulating or run command to the tags telling the tags to perform a temperature measurement, compare the measured temperature value to a threshold, and store the result in memory. The reader may then perform a subsequent inventory round, selecting only tags whose measured temperature values exceed the threshold. The reader may perform this selection by transmitting a Select command of the Gen2 Specification with a particular value in its Mask field, where the value matches the stored result of a tag whose measured temperature value exceeds the threshold. In response, only tags whose stored result matches the Mask field value (and therefore whose measured temperature values exceeded the threshold) will participate in the inventory round. Thus, the reader can identify tags (and items) whose temperatures are outside the prescribed range.

Figure 14:
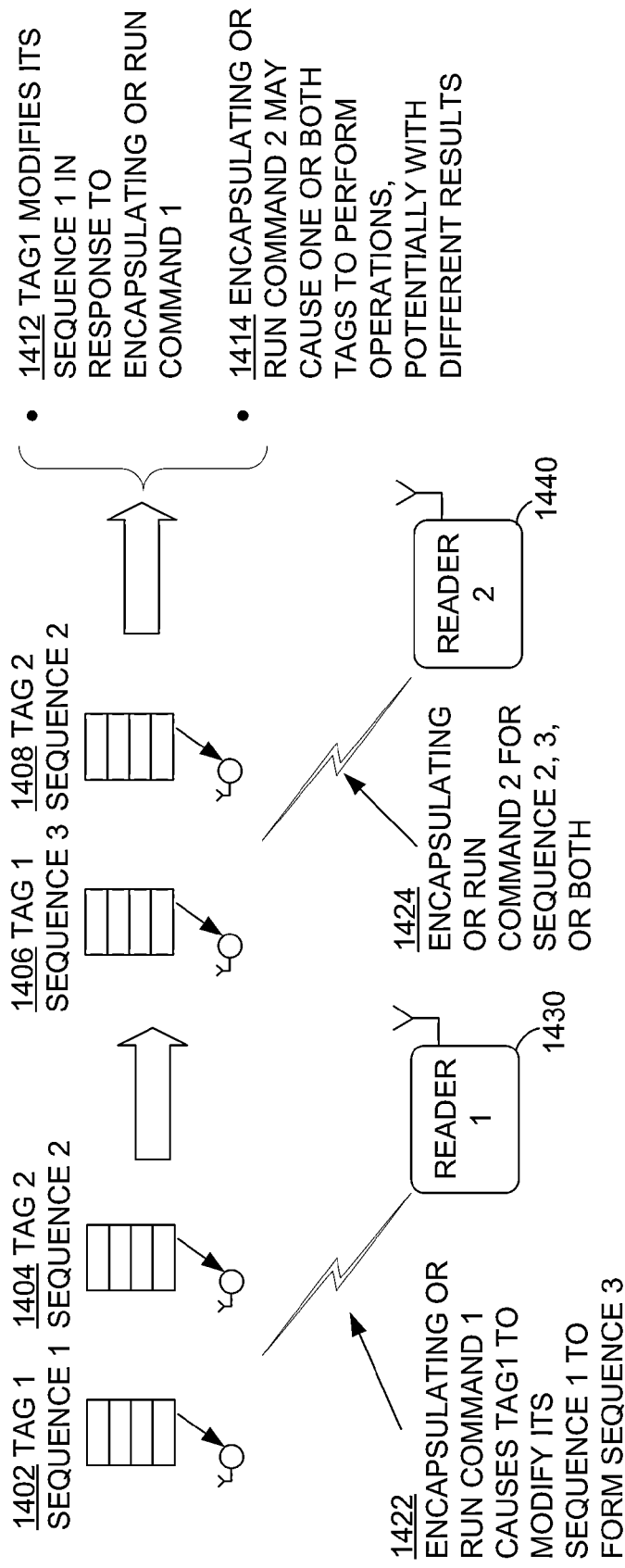
FIG. 14 is a conceptual diagram illustrating example tags modifying sequences of instructions stored in tag memory in response to a reader sending an encapsulating or run command according to certain embodiments.

FIG. 14 is a conceptual diagram illustrating tags modifying a sequence of instructions stored in tag memory in response to an encapsulating or run command according to some embodiments.

In some example implementations, the arrangement of a sequence of instructions stored in tag memory at manufacturing or in response to a command from a reader may be modified by subsequent command(s) from readers, causing the tags to behave differently and perform operations with potentially different results. For example, as shown in FIG. 14, instructions are stored in tag 1 with a first sequence (sequence 1, 1402), whereas instructions are stored in tag 2 with a second, different sequence (sequence 2, 1404). While the individual instructions stored in each tag may be the same, the differences in instruction sequence may cause the tags to generate different results upon instruction execution.

Figure 15:
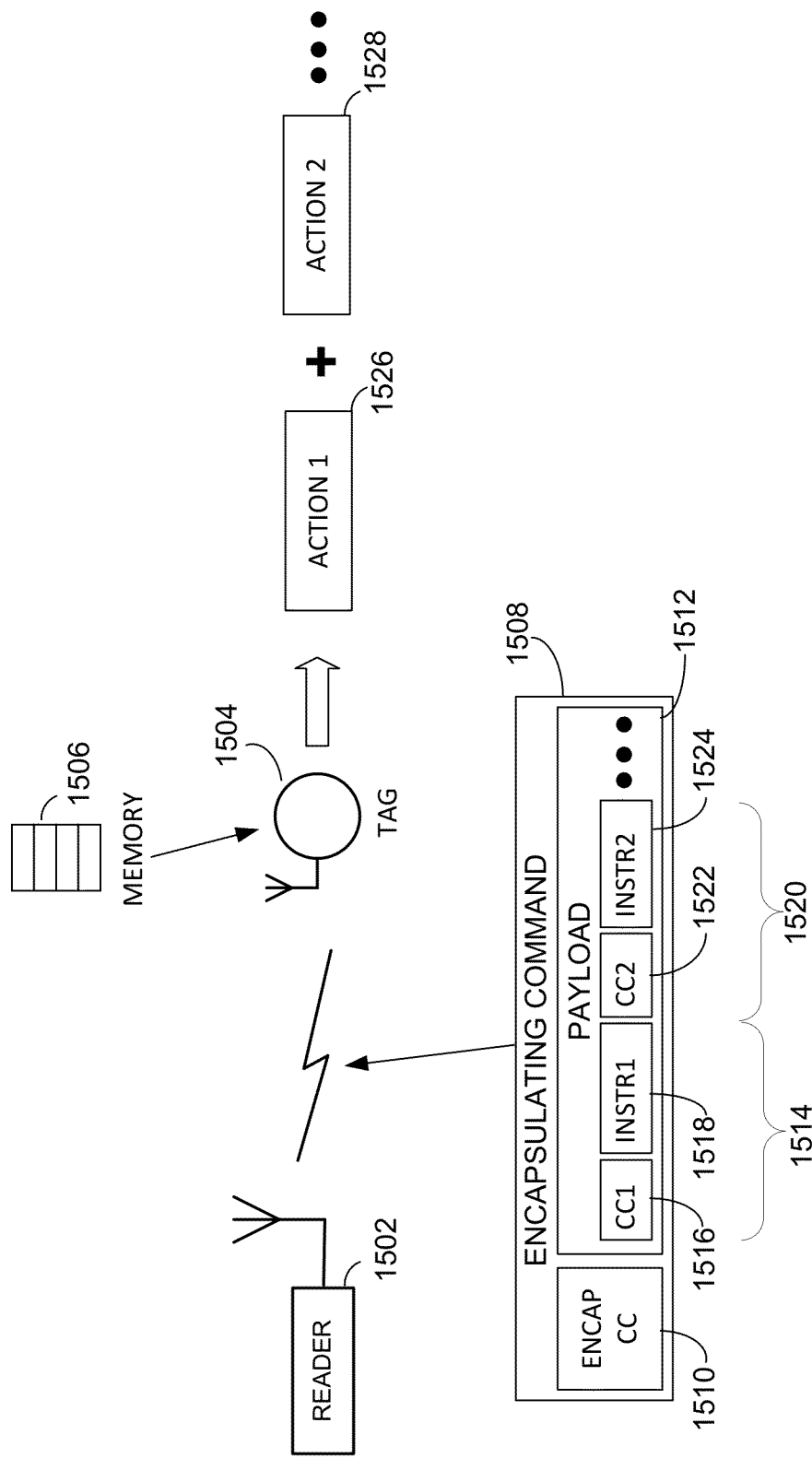
FIG. 15 illustrates an example tag performing actions in response to receiving an encapsulating command containing instructions according to embodiments.

A first encapsulating or run command 1422 transmitted by reader 1430 causes tag 1 to modify the sequence of its instructions from sequence 1 to a new sequence (sequence 3), while leaving tag 2 (and its instruction sequence) unaffected. Thus, after the first command 1422, tag 1 now has instructions in a sequence 3 (1406) while tag 2 still has instructions in sequence 2 (1408). Subsequently, another reader 1440 transmits a second command 1424 that causes tags with instruction sequences 2, 3, or both to execute their stored instruction according to their respective sequences. Tag 2, with instruction sequence 2, performs its instructions in sequence 2 upon receiving command 1424. Tag 1, which originally had its instruction sequence in sequence 1, also performs its instructions upon receiving command 1424, but in sequence 3 instead of 1, because its instruction sequence was changed by the first command (1412). However, while the second command causes both tags to execute stored instructions/programs, the differences in executed instruction sequence may lead to different results for each tag (1414). One or both tags may also store the generated results in their memories, and the reader may select tags based on the generated and stored results. In some embodiments, the programs may be a priori known programs, in which case the command(s) do not have to designate a memory location FIG. 15 depicts a tag storing instructions in its memory in response to a reader command according to some embodiments. In this example scenario, reader 1502 transmits an encapsulating command 1508, either before or after singulating the tag. The encapsulating command 1508 includes an encapsulating command code 1510 and a payload 1512. The encapsulating command code 1510 indicates the encapsulating command itself. For example, if the encapsulating command 1508 is a Select command then the command code 1510 would indicate that the encapsulating command 1508 is a Select. The payload 1512 includes one or more commands. Although FIG. 15 depicts payload 1512 as containing two commands (1514 and 1520), it should be understood that payload 1512 may contain more or fewer commands. Each command includes an associated command code (CC) and at least one instruction (INST), and may also include one or more parameters associated with the command. In some embodiments, the payload 1512 may include one or more programs.

Tag 1504, upon receiving the encapsulating command 1508, optionally stores the encapsulated instructions 1518 and 1524 in memory 1506. In some embodiments, the tag stores the included instructions and their associated command codes 1516 and 1522 in tag memory, ordered as they were received in the payload 1512. Optionally, the tag may strip the command codes from one or more of the included commands before storage, and/or may store the included instructions in a different order. The tag can combine the received instructions with instruction(s) already stored in the tag memory 1506 to form one or more programs. The tag can also combine the received instructions with programs already known by or stored in the tag. In some embodiments, commands or programs may be contained in one encapsulating command, or spread across multiple encapsulating commands. Upon receiving the encapsulating command 1508, tag 1504 may or may not transmit a reply to the reader.

The tag may then execute instructions 1518 and 1524, resulting in corresponding actions 1 (1526) and 2 (1528). The tag may execute the instructions either immediately upon receiving the encapsulating command 1508, upon receiving another command, or upon a trigger event. The trigger event may include, but is not limited to, a sensor or user interface input (e.g., if a sensor input is above a threshold, below a threshold, or within a particular range, where the threshold and/or range can be predefined or dynamically determined, or can be a binary event such as a button push or switch actuation), a tag power condition (e.g., a tag power down, such as when a passive tag moves out of range of a reader, an active tag detects low power, a tag receives a command to power-down; a tag power up, such as when a passive tag moves into range of a reader; or when a tag detects a particular power level), or expiration of a tag timer (i.e., a timer located on a tag).

Embodiments also include methods. Some are methods performed by an RFID reader for causing the tags to store one or more instructions received from the reader to be executed later. These methods can be implemented in any number of ways, including using the structures described in this document. One such way is by machine operations, of devices of the type described in this document. Another way is for one or more of the individual operations to be performed by one or more human operators. These human operators need not be collocated with each other, but each can be with a machine that performs a portion of a program or operation.

Figure 16:
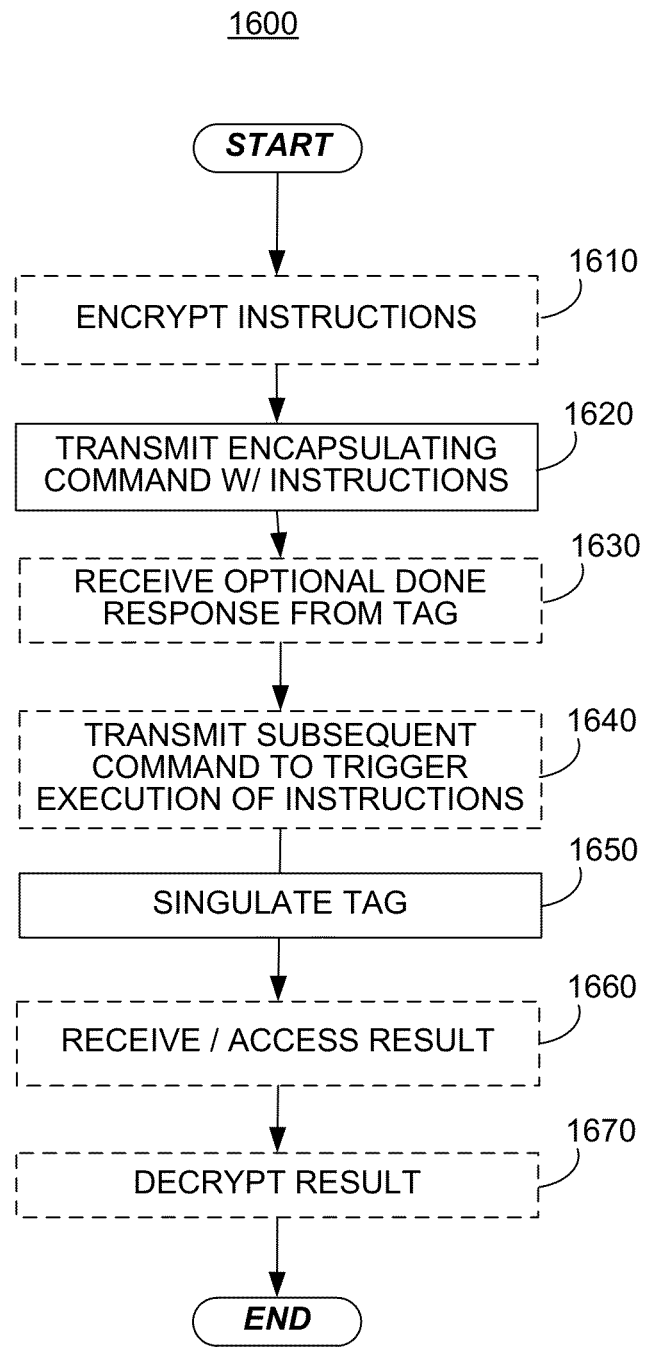
FIG. 16 is a flowchart illustrating an example method of reader transmission of an encapsulating command according to some embodiments.

FIG. 16 is a flowchart illustrating an example method 1600 of reader transmission of an encapsulating command according to some embodiments. The example method may begin with optional step 1610, where the reader encrypts instructions to be encapsulated in an encapsulating command. While method 1600 refers specifically to "instructions", it should be understood that method 1600 is equally applicable to commands (command codes and associated instructions) and/or programs (sequences of instructions or commands). At step 1620, the reader transmits the encapsulating command with encapsulated instructions (encrypted or not) to one or more tags prior to singulating the tag(s). The encapsulating command may cause the receiving tags to store and/or execute the encapsulated instructions. At optional step 1630, the reader may receive a "done" response from tag(s) that received the transmitted encapsulating command, succeeded in storing the encapsulated instructions, and/or executed the encapsulated instructions. In other embodiments, tags that receive the encapsulating command, store the encapsulated instructions, or execute the encapsulated instructions do not reply with a "done" response.

Subsequently, the reader may optionally transmit another command to trigger tag execution of the transmitted instructions (step 1640). The tag(s) may also execute the instructions in response to a trigger event. The trigger event may include, but is not limited to, a sensor or user interface input (e.g., if a sensor input is above a threshold, below a threshold, or within a particular range, where the threshold and/or range can be predefined or dynamically determined, or can be a binary event such as a button push or switch actuation), a tag power condition (e.g., a tag power down, such as when a passive tag moves out of range of a reader, an active tag detects low power, a tag receives a command to power-down; a tag power up, such as when a passive tag moves into range of a reader; or when a tag detects a particular power level), or expiration of a tag timer (i.e., a timer located on a tag). As described above, in some embodiments the trigger command or event is not necessary because the tag or tags execute the instruction(s) in response to the encapsulating command (step 1620).

Upon executing the instructions, the tags may generate results, which may differ depending on the order of the instructions and/or parameter(s) associated with execution of the instructions, and may transmit the results to the reader or store the results in tag memory. In optional step 1660, the reader may receive the tag-generated results, or may access stored results directly by, for example, reading the results from tag memory. The reader may also singulate a tag at step 1650 between the tag receiving the trigger event and the reader receiving results from the tag or accessing the tag. In some embodiments, the tag(s) may encrypt the generated results before transmitting the results to the reader or storing them in tag memory. If so, the reader decrypts the results at optional step 1670. The tags may respond differently to a subsequent reader command, such as a Query, depending on the results generated.

Figure 17:
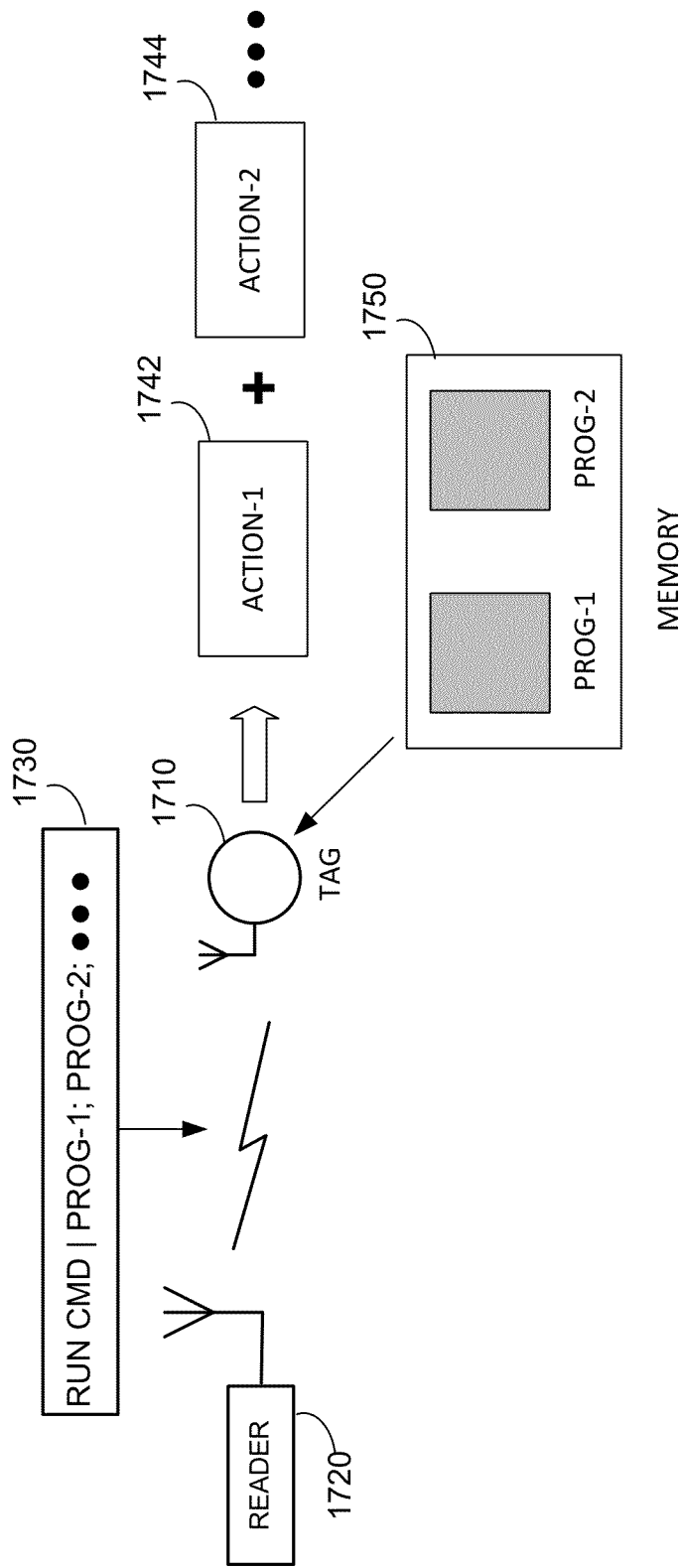
FIG. 17 illustrates an example tag performing multiple, stored operations in response to receiving a run command from a reader prior to the tag being singulated according to embodiments.

FIG. 17 illustrates an example of a tag executing multiple, stored programs in response to receiving a run command from a reader prior to the tag being singulated. In this example, reader 1720 transmits a run command 1730, which includes in its payload indication(s) for programs corresponding to actions 1 (1742) and 2 (1744), and possibly other programs stored in memory 1750 of tag 1710. Tag 1710 may or may not transmit a reply to the reader in response to receiving the run command 1730. Tag 1710 retrieves the stored programs from its memory 1750 upon receiving the run command 1730 and executes them in the order indicated by the run command 1730. Alternatively, the execution order of the programs may be based on one or more parameters included in the run command 1730 (e.g. a conditional parameter), a pre-programmed instruction in the tag, a result of executing the first program, or any other condition.

An RFID reader according to embodiments may cause a tag to execute any number of programs stored in the tag's memory. In some embodiments, the reader may transmit a command indicating two or more of those programs in a predefined order and cause the tag to execute the indicated programs in the predefined order. Of course, not all stored programs have to be executed each time and not in the order of storage. A reader may instruct a tag may to perform any other combinations of serial or parallel execution of any number of programs with one or more run commands prior to tag singulation.

Figure 18:
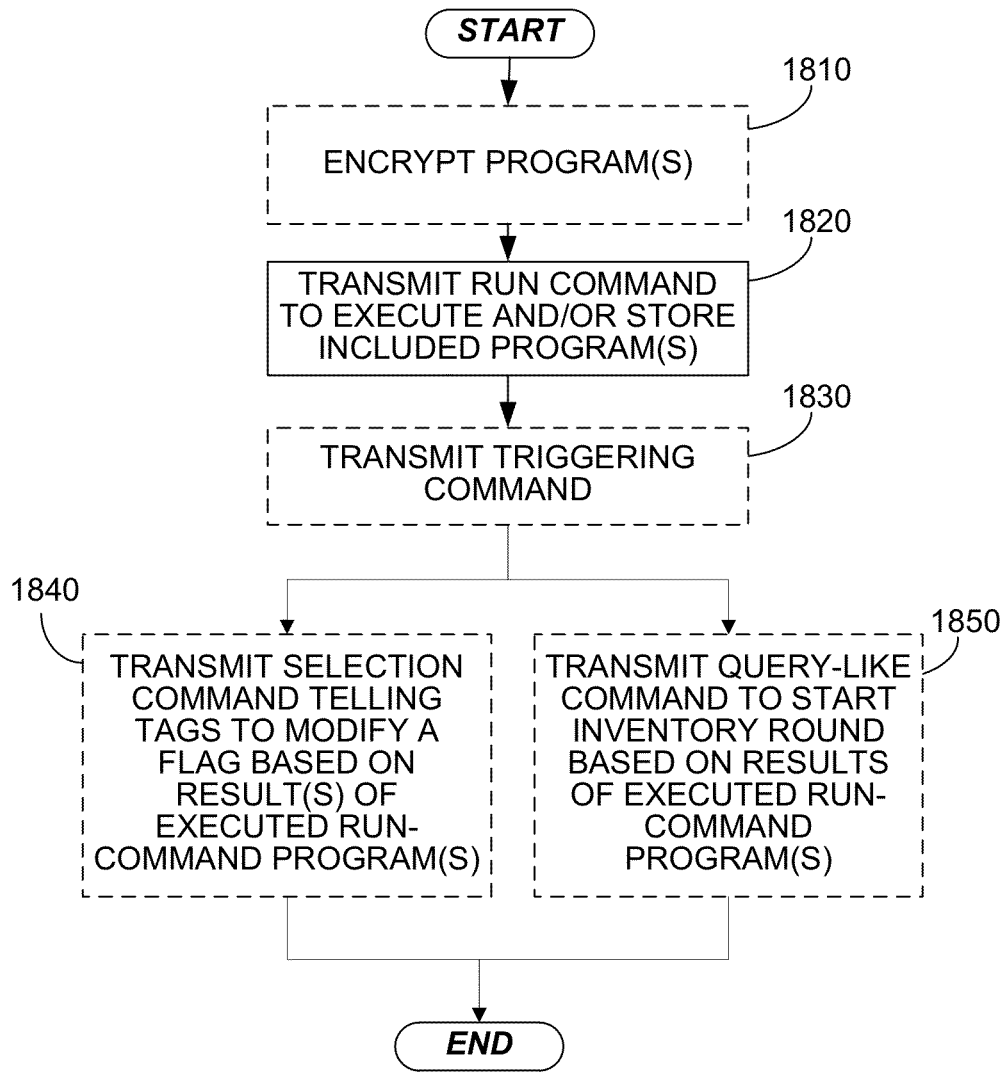
FIG. 18 is a flowchart illustrating an example method of reader transmission of a run command containing programs according to some embodiments.

FIG. 18 is a flowchart illustrating an example method of reader transmission of a run command with programs according to some embodiments. First, in optional step 1810, the reader encrypts one or more programs. In some embodiments the reader may encrypt the entire run command including the programs, whereas in other embodiments the reader may encrypt only a portion of the run command such as the programs or parameter(s) associated with the execution of the programs. In step 1820, the reader transmits the run command, encrypted or not, to one or more tags, before singulating the tag(s). The run command may instruct the tag(s) to execute the included programs, store the included programs in tag memory, or execute and/or store the included programs at some later time or upon a subsequent event. In some embodiments, execution of the included programs may be modified by one or more parameters included in the run command, included in a subsequent command, or determined by the tag.

The reader may subsequently transmit a triggering command at optional step 1830 to trigger tag execution of the transmitted programs. The tag(s) may also execute the programs in response to a trigger event. The trigger event may include, but is not limited to, a sensor or user interface input (e.g., if a sensor input is above a threshold, below a threshold, or within a particular range, where the threshold and/or range can be predefined or dynamically determined, or can be a binary event such as a button push or switch actuation), a tag power condition (e.g., a tag power down, such as when a passive tag moves out of range of a reader, an active tag detects low power, a tag receives a command to power-down; a tag power up, such as when a passive tag moves into range of a reader; or when a tag detects a particular power level), or expiration of a tag timer (i.e., a timer located on a tag).

Following transmission of the run command at step 1820, the reader may transmit a selection command at optional step 1840 instructing the tags to modify a flag based on a result of the programs executed in response to the run command and/or the one or more triggering events. Alternatively, the reader may transmit a Query-like command at optional step 1850 to begin an inventory round based on the results of the executed programs. In some embodiments, not shown in FIG. 18, the reader may transmit a Query-like command following transmission of the selection command in optional step 1840. In some embodiments the Query-like command may specify that only tags with a certain flag value participate in the inventory round initiated by the Query-like command. Thus, the reader may transmit a selection command to the tag and cause the tag to determine whether to participate in a subsequent inventory round is further based on a comparison of at least one field of the selection command to the stored result.

Figure 19:
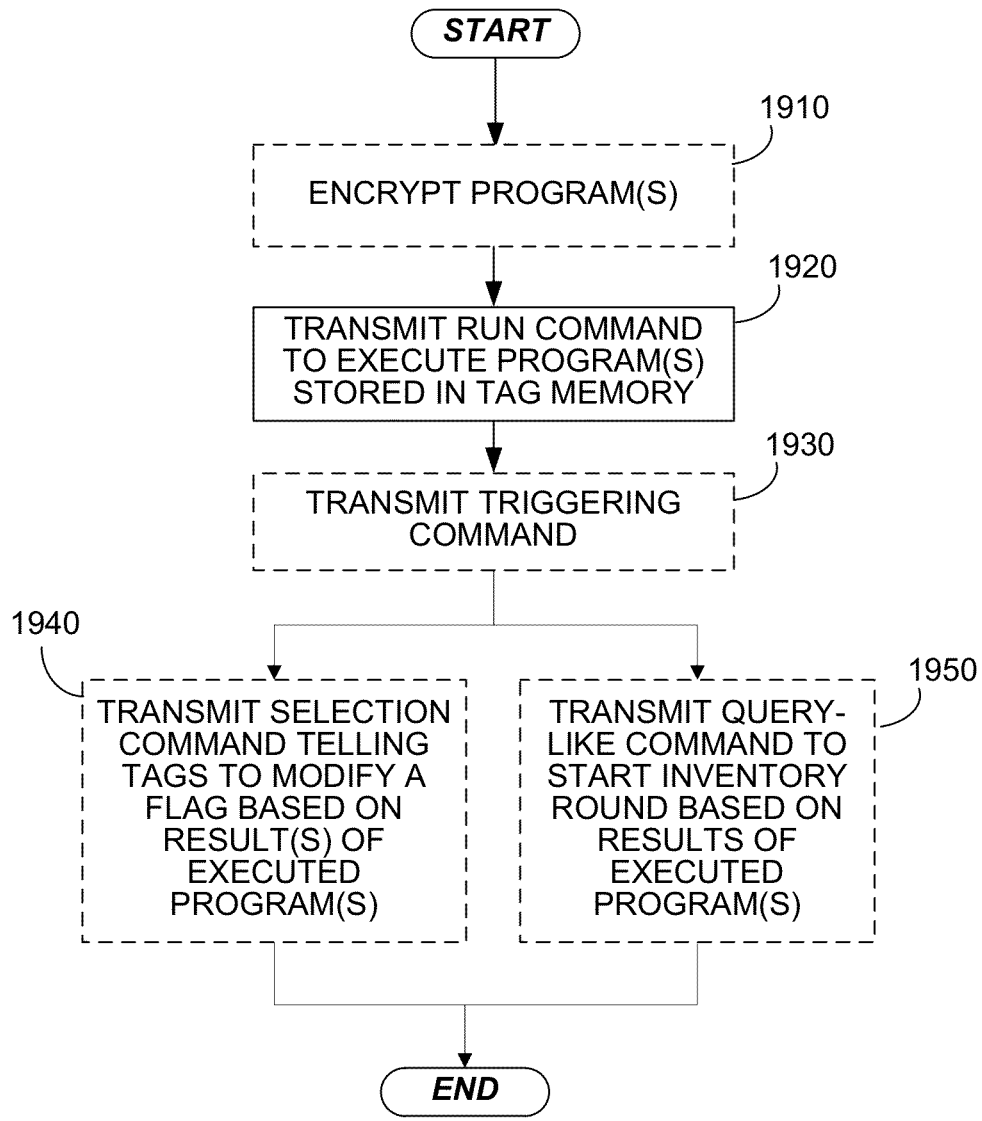
FIG. 19 is a flowchart illustrating an example method of reader transmission of a run command specifying stored programs according to some embodiments.

FIG. 19 is a flowchart illustrating an example method of reader transmission of a run command specifying stored programs according to some embodiments. First, in optional step 1910, the reader encrypts the payload of the run command which specifies the one or more programs stored in tag memory. In some embodiments the reader may encrypt the entire run command including the payload specifying the programs stored in tag memory and/or parameter(s) associated with the execution of those programs, whereas in other embodiments the reader may encrypt only a portion of the run command such as the programs or parameter(s) associated with the execution of the programs. In step 1920, the reader transmits the run command, encrypted or not, to one or more tags, before singulating the tag(s). The run command may instruct the tag(s) to immediately execute the specified programs or to execute the specified programs at some later time or upon a subsequent event. Each of the programs may be stored in tag memory as a sequence of instructions. The execution order of the programs or instructions within each program may be determined by a parameter in the run command or by a pre-programmed instruction in the tag memory.

The reader may subsequently transmit a triggering command at optional step 1930 to trigger tag execution of the specified programs. The tag(s) may also execute the programs in response to a trigger event. The trigger event may include, but is not limited to, a sensor or user interface input (e.g., if a sensor input is above a threshold, below a threshold, or within a particular range, where the threshold and/or range can be predefined or dynamically determined, or can be a binary event such as a button push or switch actuation), a tag power condition (e.g., a tag power down, such as when a passive tag moves out of range of a reader, an active tag detects low power, a tag receives a command to power-down; a tag power up, such as when a passive tag moves into range of a reader; or when a tag detects a particular power level), or expiration of a tag timer (i.e., a timer located on a tag).

Following transmission of the run command at step 1920, the reader may transmit a selection command at optional step 1940 instructing the tags to modify a flag based on a result of the programs executed in response to the run command and/or the one or more triggering events. Alternatively, the reader may transmit a Query-like command at optional step 1950 to begin an inventory round based on the results of the executed programs. In some embodiments, not shown in FIG. 19, the reader may transmit a Query-like command following transmission of the selection command in optional step 1940. In some embodiments the Query-like command may specify that only tags with a certain flag value participate in the inventory round initiated by the Query-like command.

The operations described in processes 1600, 1800, and 1900 are for illustration purposes only. Causing tags to execute programmable instructions sent in a command prior to singulation, store programmable instructions for subsequent execution, and/or execute multiple operations stored in tag memory prior to singulation may be performed employing additional or fewer operations and in different orders using the principles described herein. Of course, an order of the operations may be modified, some operations eliminated, or other operations added according to other embodiments.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for a Radio Frequency Identification (RFID) reader, comprising: transmitting an encapsulating command to an RFID tag, the encapsulating command including: an encapsulating command code and a payload; wherein the payload including: a first command code; a first instruction associated with the first command code and configured to cause the tag to perform a first action; a second command code; and a second instruction associated with the second command code and configured to cause the tag to perform a second action.

2. The method of claim 1, wherein the encapsulating command further includes:
   a preamble associated with the encapsulating command; and
   an error-check code associated with the encapsulating command.

3. The method of claim 1, wherein the encapsulating command further includes a parameter related to the first action.

4. The method of claim 3, wherein the parameter specifies an order in which to execute the first instruction relative to the execution of another instruction for the tag.

5. The method of claim 1, further comprising:
   causing the tag to perform at least one from a set of:
      determining whether to participate in a subsequent inventory round;
      modifying a behavior during a subsequent inventory round; and
      storing a result in a tag memory, based at least in part on a result of the first action.

6. The method of claim 1, further comprising:
   specifying a trigger event that causes the tag to execute the first instruction, the trigger event selected from:
      the tag receiving the encapsulated command;
      the tag receiving a subsequent command;
      a tag power condition;
      a tag timer expiration; and
      a tag sensor input.

7. The method of claim 1, further comprising:

causing the tag to store the first instruction in a tag memory location in response to the encapsulating command.

8. The method of claim 1, wherein the encapsulating command is a Select command of the Gen2 Specification.

9. The method of claim 1, wherein the encapsulating command is transmitted to the tag prior to transmitting a singulating command to the tag.

10. The method of claim 9, wherein the singulating command is a Query/Query-like command.

11. The method of claim 1, wherein the first instruction is at least one from a set of:

encrypted;

electronically signed;

combined with a message count; and combined with a message authentication code.

12. A Radio Frequency Identification (RFID) reader, comprising: a processing block configured to: transmit an encapsulating command to an RFID tag, the encapsulating command including: a first command code associated with the encapsulating command and a payload; wherein the payload including: a first command code; and a first instruction associated with the first command code and configured to cause the tag to perform a first action; and a second command code; and a second instruction associated with the second command code and configured to cause the tag to perform a second action.

13. The reader of claim 12, wherein the encapsulating command further includes:

a preamble associated with the encapsulating command; and an error check code associated with the encapsulating command.

14. The reader of claim 12, wherein the encapsulating command further includes a parameter related to the first action.

15. The reader of claim 14, wherein the parameter specifies an order in which to execute the first instruction relative to the execution of another instruction.

16. The reader of claim 12, wherein the processing block is further configured to:

cause the tag to, based at least in part on a result of the first action, perform at least one of:

determine whether to participate in a subsequent inventory round;

modify a behavior during a subsequent inventory round; and store the result in a tag memory.

17. The reader of claim 12, wherein the processing block is further configured to:

specify a trigger event that causes the tag to execute the first instruction, the trigger event selected from:

the tag receiving the encapsulated command;

the tag receiving a subsequent command;

a tag power condition;

a tag timer expiration; and a tag sensor input.

18. The reader of claim 12, wherein the processing block is further configured to:

cause the tag to store the first instruction in a tag memory location in response to the encapsulating command.

19. The reader of claim 12, wherein the encapsulating command is a Select command of the Gen2 Specification.

20. The reader of claim 12, wherein the processing block is configured to transmit the encapsulating command prior to transmitting a singulating command to the tag.

21. The reader of claim 20, wherein the singulating command is a Query/Query-like command.

22. The reader of claim 12, wherein the first instruction is at least one of:

encrypted;

electronically signed;

combined with a message count; and combined with a message authentication code.

23. A method for a Radio Frequency Identification (RFID) reader, comprising: transmitting an encapsulating command to a tag, the encapsulating command including: an encapsulating command code and a payload; wherein the payload including: a first command code; and a first instruction associated with the first command code and configured to cause the tag to perform a first action; a second command code; and a second instruction associated with the second command code and configured to cause the tag to perform a second action; and at least one of: encrypting the first instruction, and decrypting a result of the first action received from the tag.

* * * * *

UNITED STATES PATENT AND TRADEMARK OFFICE
CERTIFICATE OF CORRECTION

PATENT NO. : 8,698,629 B1  
APPLICATION NO. : 13/164593  
DATED : April 15, 2014  
INVENTOR(S) : Stanford et al.

Page 1 of 1

It is certified that error appears in the above-identified patent and that said Letters Patent is hereby corrected as shown below:

In The Specification

In Column 3, Line 30, Delete "embodiments;" and insert -- embodiments. --, therefor.

In Column 3, Line 34, Delete "memory" and insert -- memory. --, therefor.

In Column 10, Line 63, Delete "Gen 2" and insert -- Gen2 --, therefor.

In Column 17, Line 14, Delete "location" and insert -- location. --, therefor.

In The Claims

In Column 22, Line 34-35, In Claim 1, delete "code and a payload; wherein the payload including: a first command code;" and insert -- code, and a payload including: a first command code; and --, therefor.

In Column 23, Line 25-26, In Claim 12, delete "command and a payload; wherein the payload including:" and insert -- command; and a payload including: --, therefor.

In Column 24, Line 37-38, In Claim 23, delete "code and a payload; wherein the payload including:" and insert -- code; and a payload including: --, therefor.

Signed and Sealed this  
Twenty-second Day of September, 2015

Michelle K. Lee  
*Director of the United States Patent and Trademark Office*